ns OR 4,047,796

United States Patent
Kao et al.

[11] 4,047,796
[45] Sept. 13, 1977

[54] PRECISION OPTICAL FIBER CONNECTOR

[75] Inventors: Charles Kuen Kao; Lozure Gene Wolfgang, both of Roanoke, Va.

[73] Assignee: International Telephone and Telegraph Corporation, Nutley, N.J.

[21] Appl. No.: 613,390

[22] Filed: Sept. 15, 1975

[51] Int. Cl.² .............................................. G02B 5/14
[52] U.S. Cl. ................................................ 350/96 C
[58] Field of Search ..................................... 350/96 C

[56] References Cited
U.S. PATENT DOCUMENTS

| | | | |
|---|---|---|---|
| 3,535,017 | 10/1970 | Miller | 350/96 B |
| 3,864,018 | 2/1975 | Miller | 350/96 C |
| 3,885,859 | 5/1975 | Dalgleish et al. | 350/96 C |

*Primary Examiner*—Edward S. Bauer
*Assistant Examiner*—Rolf Hille
*Attorney, Agent, or Firm*—John T. O'Halloran; Peter C. Van Der Sluys; Richard A. Menelly

[57] ABSTRACT

Optical fiber ends are precisely aligned and coupled together in the interstice between a plurality of like contacting cylindrical rods. The rods are mounted along and around the fibers within an adjustable connector assembly. Means are provided for expanding the interstice to inset the fiber ends and for clamping the rods in position around the fibers. A plurality of connectors may be used to align a number of optical fibers enclosed in a common cable or bundle.

4 Claims, 8 Drawing Figures

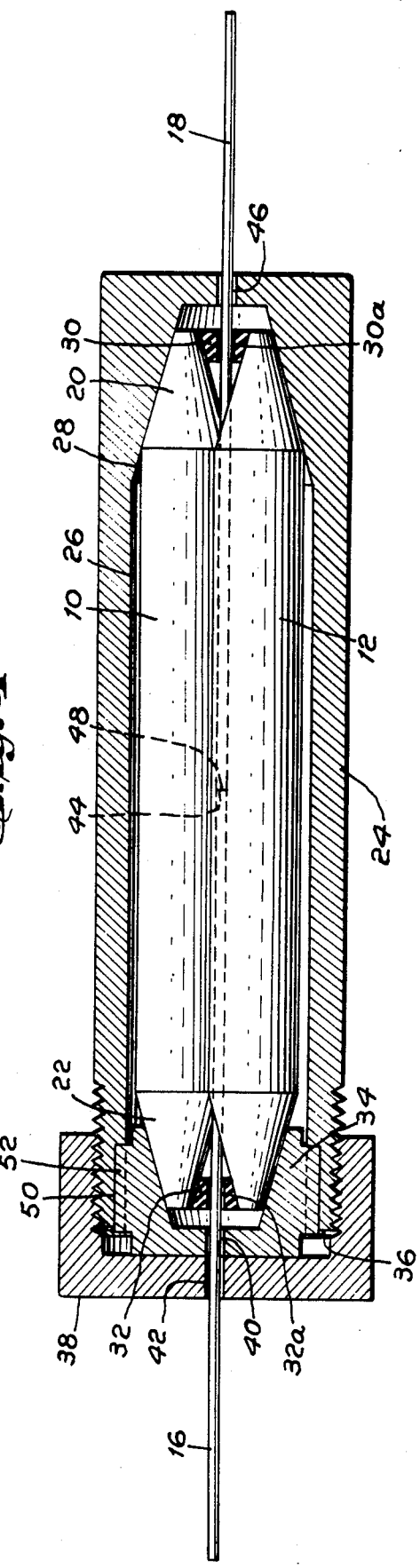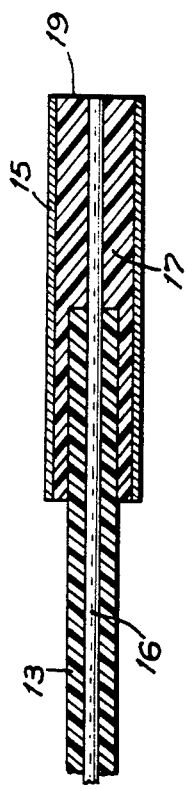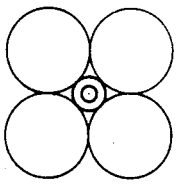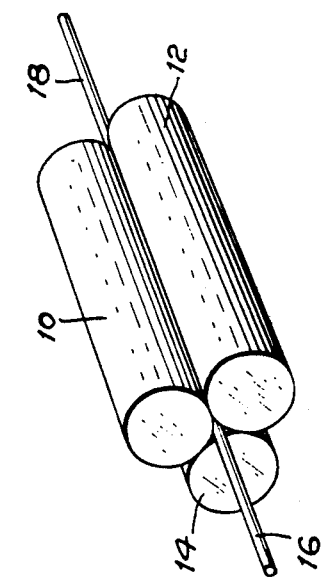

PRECISION OPTICAL FIBER CONNECTOR

BACKGROUND OF THE INVENTION

1. Field of the Invention

This invention relates to optical fiber connectors and particularly to a novel adjustable connector assembly for precisely aligning fiber ends.

2. Description of the Prior Art

In order to reduce light losses between butt-coupled optical fibers, the fiber ends must be precisely aligned exially and angularly with substantially no separation between the ends. One previous device for this purpose utilizes a baseplate with V-shaped grooves to hold the fibers, as shown in U.S. Pat. No. 3,768,146, issued Oct. 30, 1973. A metallic sleeve is crimped over the adjacent ends by a compression plate to secure and align the fibers within the groove. Another known device, as shown in U.S. Pat. No. 3,734,594, issued May 22, 1973, utilized a deformable annular core having pressure plates at the ends. The fiber ends are inserted into the core and a force on the plates deforms the core to align and secure the fibers. These prior art devices, however, did not readily provide sufficient accuracy for joining and aligning small diameter cores of optical fibers. An axial displacement of 5 microns, for example, can cause a loss of 1 dB for a 25 micron core fiber. Available displacement tolerances of about ±50 microns in conventional devices is therefore highly inadequate. A satisfactory device would require a tolerance of about ±2 microns, which would be very difficult and costly to achieve with known techniques.

The use of spacer fibers and a containing member to support a central optical fiber is also known, as shown in U.S. Pat. No. 3,535,017 issued Oct. 20, 1970. This, however, was for the purpose of providing particular transmission mode characteristics obtained by an asymetrical relationship of the elements. The arrangement did not provide coupling and precision alignment of adjacent fiber ends in an adjustable assembly.

SUMMARY OF THE INVENTION

It is therefore the primary object of the present invention to provide a simple, inexpensive, highly accurate connector for coupling the ends of optical fibers.

This is achieved with a novel connector arrangement employing a plurality of highly precise contacting cylindrical rods of like dimensions which support the abutting optical fiber ends in the interstice between the rods. The rods are adjustly mounted around the fiber ends and secured within a housing having a clamp at one end. The rods are movable radially to permit expansion of the interstice for insertion of the fiber ends. The clamp tightens a compression ring around tapered ends of the rods so that the rods engage the fibers and maintain the ends in a precisely aligned relationship. Other objects and advantages will become apparent from the following description taken in conjunction with the accompanying drawings.

DESCRIPTION OF THE DRAWINGS

FIG. 1 is an isometric view of the novel arrangement of cylindrical rods supporting optical fiber ends in the interstitial space;

FIG. 2 is a cross-section of an optical fiber end enclosed in a ferrule;

FIG. 3 is an expanded end view of the three rods and center fiber of FIG. 1 showing the angular and radial relationships;

FIG. 4 is a partial cross-section of the optical fiber connector showing the assembly of rods within the adjustable housing;

FIG. 5 is an end view of the compression ring and housing of FIG. 4;

FIG. 6 is an end view of an alternative configuration of three rods enclosing an optical fiber; and FIGS. 7 and 8 show end views of further alternative configurations.

DESCRIPTION OF THE PREFERRED EMBODIMENTS

As shown in FIG. 1, a plurality of solid cylindrical ground rods 10, 12, 14 are fabricated to a very close tolerence, typically of ±0.0001 inches for a 12 inch long rod and much less for smaller rods. Placement of three such rods, with the circumferential surfaces in contact, provides an interstitial space that forms a highly accurate guide for small diameter glass optical fibers 16, 18 which may be inserted from either end. As shown in FIG. 2, the glass fibers may have a protective plastic coating 13. To provide additional strength for the fragile fibers, a further protective enclosure in the form of long metal sleeves or ferrules 15 may be employed to fit closely around the fibers which are sealed therein at the ends by a suitable plastic material 17. The facing ends 19 of each of the fibers to be aligned are lapped and polished to provide smooth parallel mating faces for a butt joint. If ferrules are used, the ends of both the fibers and ferrules are lapped to provide a common smooth surface. The supporting rods may be made of any suitable materials which can be precision ground to a close tolerance, such as stainless steel or ceramic.

If three rods are employed of radius R, as shown in FIG. 3, the interstice 21 defines an inscribed circle of radius $r = R$ (secant $\theta - 1$), where $\theta = 30°$. The angle is obtained, for example, by a horizontal line connecting the two centers of rods 12 and 14 and a line between one of these centers and the center of fiber 16. The relationship is derived as follows:

$$\frac{R}{R + r} = \cos \Theta ;$$

$$R + r = \frac{R}{\cos \Theta} ;$$

$$r = \frac{R}{\cos \Theta} - R = R \left(\frac{1}{\cos \Theta} - 1\right) = R (\sec \Theta - 1) ;$$

$$2 \Theta = 60°, \Theta = 30° .$$

The maximum tolerance $dr$ for the inscribed circle will occur for a maximum deviation $\Delta R$ for all three rods. Therefore, $dr = \Delta R$ (sec $\theta - 1$). If $\Delta R = \pm 0.0001$ inches, $dr \approx \pm 0.000015$ inches $= \pm 0.38$ microns. Maximum angular tolerance for a 1 inch long assembly is, therefore, about $2 \cdot 10^{-4}$ radians or $\approx 1.14 \cdot 10^{-2}$ degrees. Since a tolerance of $\pm 0.0001$ inch can be obtained for a 12 inch long rod, a much closer tolerance than indicated above can be obtained for a 1 inch long assembly.

While the rods can be made to highly precise dimensions, it is difficult to fabricate the fiber or ferrule to sub-micron tolerances and to insert these into a fixed rod assembly. Therefore, the size of the interstice between the rods is made adjustable and provision is made to clamp the rods after insertion of the fibers or ferrules.

This is accomplished with a demountable assembly such as shown in FIG. 4. The three identically sized precision cylindrical rods 10, 12, 14 are each formed with two conically shaped tapered ends 20, 22. The rods are received in a housing 24 having a cylindrical bore 26 of a larger diameter than the three assembled rods. The bore has a like tapered inner end wall 28 to engage the rod ends 20. The housing may be made to stainless steel.

The three rods 10, 12, 14 are held together as a sub-assembly by tapered sleeves 30, 32 of a soft elastomer material such as silicone rubber, at opposite ends of the rods. The elastomer is bonded only to the interior portion of the tapered ends of the rods so as not to interfere with the action of a compression ring 34 and the tapered inner end wall 28. Apertures 30a, 32a in sleeves 30, 32, somewhat larger than the diameter of fibers 16, 18, are provided so that these fibers may be easily inserted through the elastomer into the interstitial region defined by the three rods. The elastomer material, in a relaxed condition, serves to separate the three rods slightly and permits the fibers to slide easily into the expanded interstitial region. Separation of the rods is such as to allow easy movement of the fiber but not so great as to permit the fiber to escape from the interstitial region.

In forming a connection, the sub-assembly of rods is first inserted into the front opening of the housing 36. The cup shaped compression ring 34 of a suitable metal, such as brass, having an inner tapered wall matching that of the rod ends, is then positioned in the front opening 36. An end cap 38 is screwed loosely onto the front end of the housing. Both the compression ring 34 and end cap 38 are provided with apertures 40, 42 for admission of the fiber 16. Fiber 16 is then inserted into the connector such that the polished end 44 terminates near the middle of the rod sub-asembly. The other fiber 18 is inserted through aperture 46 of the housing 24 until the ends 44, 48 of both fibers are in contact. Holding the fibers in contact, end cap 38 is then tightened. As the end cap is tightened, the adjacent compression ring 34 is forced into engagement with the tapered ends 22 of rods 10, 12 14 to press the rod radially inward at that end. At the same time, the opposite tapered ends 20 are pressed against the tapered housing walls 28 which also directs the rods inwardly, so that the rods are firmly secured against the optical fibers in the interstice. This automatically aligns the two inner optical fiber ends. In order to couple and align a plurality of optical fibers in a cable, a plurality of like assemblies of housings enclosing three rods around fiber ends may be used.

As shown in FIG. 5, a compression ring guide 50, which may be a longitudinal slot or pair of slots in the bore at the open end of 36 of housing 24, receives a mating longitudinal projection 52 from the compression ring 34. The guide 50 prevents rotation of the compression ring 34 and twisting of the rods when threaded end cap 38 engages the mating threads 54 at the outer end of housing 24.

An alternative configuration using three cylindrical rods for aligning optical fibers is shown in FIG. 6. In this case, the three precision ground rods 10, 12, 14 are held tightly in contact by a spring steel metal cylinder retainer 55 having a longitudinal split or slot 56 along the top. An expander 58, which may be a rectangular piece of metal having a length somewhat less than the length of a rod, is positioned in the slot 56. A flexible plastic or elastomer coating 60 covers the outside of the retainer 55 and seals the expander 58 in the slot. The expander can then be depressed to separate the upper rods 12, 14 and increase the interstice 62 formed by the three rods. The fibers, or ferrules containing the fibers, are then inserted from each end until the inner ends contact and the expander is released. The metal spring retainer 55 then causes the rods to contact one another and bear tightly against the fibers to accurately align the abutting fiber ends.

Various other modifications can be made in this configuration to accomplish the same action. The expander can be wedge-shaped or circular at the contact point with the upper rods. The material of the expander is preferably of a low coefficient of friction, such as a suitable plastic, or metal coated with teflon. The spring retainer can also be in the form of three spaced bands positioned at the ends and center along the rods. The spring can also be eliminated if a suitable plastic can be used to seal to the outer elastomer retainer layer to permit movement by the expander. Flexible end pieces of plastic, such as RTV silicone, can also be fitted over the ends of the rods with a center hole to guide the fibers. These would have to permit flexing of the retainer.

Further variations are shown in FIG. 7, wherein four rods may be used to align fibers in the interstice, and FIG. 8 where a combination of two rods and a flat plate are used for such alignment. This latter configuration would require a differently shaped housing.

The present invention thus provides a simple inexpensive connector device for accurately aligning and coupling the ends of optical fibers. While several embodiments have been illustrated and described, it is apparent that many other variations may be made in the particular design and configuration without departing from the scope of the invention as set forth in the appended claims.

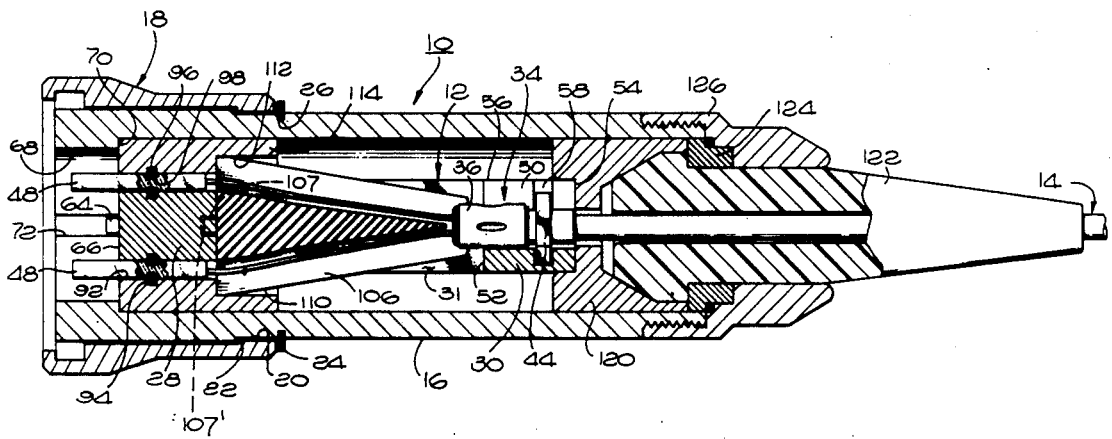

What is claimed is:
1. An optical fiber coupling device comprising:
   a tubular housing;
   a plurality of like-sized cylindrical rods supported longitudinally within said housing and having adjacent circumferential surfaces providing an interstitial space between said rods to receive abutting ends of a pair of longitudinal optical fibers, said rods being conically tapered at opposite ends providing a smaller diameter at said rod ends, said housing having a cylindrical bore with an opening at one end and a tapered wall within the other end having a conical taper corresponding to said rods to engage said rod ends, said one end of said housing having an outer threaded peripheral surface, said other end having a central aperture to receive an optical fiber therethrough;
   means for expanding said interstitial space to permit insertion of said fibers; and
   means for compressing said rods about said fibers to axially align and secure said fibers within said interstitial space said compressing means including a compression ring having corresponding tapered inner walls engaging the ends of said rods at said opening, and a threaded cap adjustably secured on said threaded end of said housing over said compression ring to urge said ring against said rods and said rods around said fibers.

2. The device of claim 1 wherein said expanding means includes an apertured elastomer material secured to the tapered ends of said rods.

3. The device of claim 1 wherein said compression ring and cap have central apertures to receive an optical fiber therethrough.

4. The device of claim 2 wherein said compression ring includes means for preventing twisting of said ring and rods upon tightening of said threaded cap.

* * * * *

United States Patent
Arnold et al.

[11] 4,047,797
[45] Sept. 13, 1977

[54] FIBER OPTIC CONNECTOR

[75] Inventors: Bruce K. Arnold, El Toro; Elias A. Moreno, Huntington Beach, both of Calif.

[73] Assignee: International Telephone and Telegraph Corporation, New York, N.Y.

[21] Appl. No.: 694,305

[22] Filed: June 9, 1976

[51] Int. Cl.² .............................................. G02B 5/16
[52] U.S. Cl. ................................................. 350/96 C
[58] Field of Search ................. 350/96 C, 96 B, 96 R, 350/96 WG

[56] References Cited

U.S. PATENT DOCUMENTS

| | | | |
|---|---|---|---|
| 3,910,678 | 10/1975 | McCartney et al. | 350/96 C |
| 3,923,371 | 12/1975 | Dalgleish | 350/96 C |
| 3,951,514 | 4/1976 | Medina, Jr. | 350/96 C |
| 3,966,299 | 6/1976 | Osterfield et al. | 350/96 C |

Primary Examiner—John K. Corbin
Assistant Examiner—Stewart Levy
Attorney, Agent, or Firm—Thomas L. Peterson

[57] ABSTRACT

A connector is disclosed for a fiber optic cable having one or more single optical fibers. A restraint member is fixedly attached to the strength member of the fiber optic cable. The restraint member is removably mounted in the rear section of a yoke while contacts terminated to the optical fibers are releasably mounted on the forward section of the yoke. The cable restraint member provides means so that the contacts may be positioned at equal distances from the end of the cable and the yoke permits the terminated fibers to be mounted in the connector without overstressing the fibers.

14 Claims, 4 Drawing Figures